(12) United States Patent
Knight

(10) Patent No.: US 7,023,454 B1
(45) Date of Patent: Apr. 4, 2006

(54) METHOD AND APPARATUS FOR CREATING A VIRTUAL VIDEO OF AN OBJECT

(76) Inventor: Andrew F. Knight, 2521 Glengyle Dr., Vienna, VA (US) 22181

(*) Notice: Subject to any disclaimer, the term of this patent is extended or adjusted under 35 U.S.C. 154(b) by 110 days.

(21) Appl. No.: 10/764,557

(22) Filed: Jan. 27, 2004

Related U.S. Application Data

(60) Provisional application No. 60/485,215, filed on Jul. 7, 2003.

(51) Int. Cl.
  *G09G 5/00* (2006.01)
  *G06T 15/70* (2006.01)
  *H04N 7/14* (2006.01)

(52) U.S. Cl. ............... 345/646; 345/473; 348/14.13

(58) Field of Classification Search ............ 345/473, 345/646
See application file for complete search history.

(56) References Cited

U.S. PATENT DOCUMENTS

| | | | |
|---|---|---|---|
| 5,347,306 A | 9/1994 | Nitta | |
| 5,652,670 A * | 7/1997 | Hayashi | 359/205 |
| 5,659,692 A | 8/1997 | Poggio et al. | |
| 6,307,576 B1 | 10/2001 | Rosenfeld | |
| 6,504,546 B1 * | 1/2003 | Cosatto et al. | 345/473 |
| 6,806,898 B1 * | 10/2004 | Toyama et al. | 348/14.16 |
| 6,807,290 B1 * | 10/2004 | Liu et al. | 382/118 |
| 2002/0154212 A1 * | 10/2002 | Thomas | 348/14.13 |

\* cited by examiner

*Primary Examiner*—Matthew C. Bella
*Assistant Examiner*—Aaron M. Richer

(57) ABSTRACT

A method for creating a virtual video includes at least one of steps a)–d): a) sending an image of an object to a receiver via an information line, the image having a plurality of identifiable image points being substantially fewer in number than a number of remaining image points of the image, and the object having a plurality of identifiable object points corresponding to the plurality of identifiable image points; b) determining object position data of the plurality of identifiable object points; c) sending the object position data to the receiver via an information line; and d) morphing the image such that image position data of the identifiable image points are adjusted to approximately correspond to the object position data, where all of steps a)–d) are performed.

10 Claims, 9 Drawing Sheets

METHOD AND APPARATUS FOR CREATING A VIRTUAL VIDEO OF AN OBJECT

CROSS REFERENCE TO RELATED APPLICATIONS

The present application claims priority to U.S. Provisional Patent Application No. 60/485,215, filed Jul. 7, 2003, the contents of which are herein incorporated by reference.

BACKGROUND OF THE INVENTION

There is a need for virtual-reality type communication. Videophones introduced about ten years ago attempted to solve this problem, but the resolution and refresh rate are severely limited by the bandwidth of typical phone lines. Even the ethernet is too slow to deliver 30 frames per second (typical video refresh rate) of high-quality (e.g., megapixel) images. Further, most people don't even have access to the ethernet. Thus, the bandwidth available to most of the public to send digital information is limited by DSL, cable, or the lowly dial-up phone line.

SUMMARY OF THE INVENTION

The present invention aims to solve at least one of these and other problems.

According to a preferred embodiment of the present invention, a method for creating a virtual video may comprise at least one of steps a)–d): a) sending an image of an object to a receiver via an information line, the image having a plurality of identifiable image points, the plurality of identifiable image points being substantially fewer in number than a number of remaining image points of the image, the object having a plurality of identifiable object points, and the plurality of identifiable image points corresponding to the plurality of identifiable object points; b) determining object position data of the plurality of identifiable object points on the object; c) sending the object position data to the receiver via an information line; and d) morphing the image such that image position data of the identifiable image points of the image are adjusted to approximately correspond to the object position data, wherein all of steps a)–d) are performed. The morphing may further comprise morphing the image such that image position data of the remaining image points are adjusted depending on the object position data. Further, the morphing may further comprise morphing the image such that, for each of the remaining image points, image position data of the each of the remaining image points depend at least partially on image position data of at least one identifiable image point and image position data of at least one other remaining image point.

In a preferred aspect, the object may comprise a face of a person and the plurality of identifiable object points may comprise at least one of the following features: an eye, a pupil, an iris, an eyelash, an eyebrow, a nose, a nostril, a mouth, a tooth, a chin, an ear, a hairline, a lip, a pore, a mole, a hair, a wrinkle, a skin discoloration, a face, an edge of any of the features, and a point within any of the features. Further, the image may comprise an image of a face of a person and the plurality of identifiable image points may comprise an image of at least one of the following features: an eye, a pupil, an iris, an eyelash, an eyebrow, a nose, a nostril, a mouth, a tooth, a chin, an ear, a hairline, a lip, a pore, a mole, a hair, a wrinkle, a skin discoloration, a face, an edge of any of the features, and a point within any of the features. At least one of the plurality of identifiable image points may be a pixel.

In another preferred aspect, the determining may comprise determining three-dimensional object position data of at least one of the plurality of identifiable object points. Further, the image may be three-dimensional.

In another preferred aspect, the method may further comprise providing at least one imaging device, and the determining may comprise: imaging the object with the imaging device so as to form a second image of the object, wherein the second image comprises a plurality of second identifiable image points corresponding to the plurality of identifiable object points on the object; identifying the plurality of second identifiable image points in the second image; determining second image position data of the plurality of second identifiable image points in the second image; and determining the object position data of the plurality of identifiable object points on the object based at least in part on the second image position data. The identifying may comprise identifying the plurality of second identifiable image points at least in part by point differentiation, whereby a second identifiable image point is identified by differentiating the second identifiable image point from other points in the second image on the basis of at least one of: absolute position in the second image; relative position compared to the other points; color; and magnitude/brightness.

In another preferred aspect, the method may further comprise providing at least one imaging device, wherein the determining may comprise for a first frame: imaging the object so as to form a second image of the object, wherein the second image comprises a plurality of second identifiable image points corresponding to the plurality of identifiable object points on the object; identifying the plurality of second identifiable image points in the second image; determining second image position data of the plurality of second identifiable image points in the second image; and determining the object position data of the plurality of identifiable object points on the object based at least in part on the second image position data, and wherein the determining may comprise for a subsequent second frame: imaging the object so as to form a third image of the object, wherein the third image comprises a plurality of third identifiable image points corresponding to the plurality of identifiable object points on the object; identifying the plurality of third identifiable image points in the third image by point tracking, whereby a third identifiable image point is identified by: selecting a group of points within a predetermined proximity to a corresponding second identifiable image point in the second image of the first frame; and identifying the third identifiable image point within the group based at least in part on a best fit analysis; determining third image position data of the plurality of third identifiable image points in the third image; and determining the object position data of the plurality of identifiable object points on the object based at least in part on the third image position data.

In another preferred aspect, a color and magnitude/brightness of the second identifiable image point and a color and magnitude/brightness of the third identifiable image point may all be inputs to the best fit analysis.

In another preferred aspect, the predetermined proximity may be chosen based at least in part on an expected motion speed of the object and a refresh time between the first and second frames. Further, the imaging device may be a video camera having a refresh time, wherein the refresh time may be shorter than an expected time for a tracked third identifiable image point to traverse a distance in the third image to a nearest other tracked third identifiable image point.

In another preferred aspect, the sending and morphing may comprise, respectively, sending and morphing in real time. Further, the method may further comprise displaying the image morphed in the morphing step, and sending voice information to the receiver.

In another preferred aspect, performance of steps b) through d) is repeated at a rate of at least 5, preferably at least 15, and more preferably at least 30 times per second.

In another preferred aspect, the method may further comprise providing a laser system comprising a laser and a laser light detector, wherein the determining may comprise determining the object position data of the plurality of identifiable object points on the object based at least in part on information received from the laser system.

In another preferred aspect, the present invention provides for a computer readable medium containing machine-executable code and configured to cause a machine to perform the methods disclosed herein.

In another preferred embodiment of the present invention, a method for creating a virtual video may comprise at least one of steps a)–e): a) sending an image of a face to a receiver via an information line, the image including a mouth image of a mouth of the face; b) identifying mouth image position data of edges of the mouth image; c) sending voice information to the receiver via an information line; d) recognizing the voice information; and e) morphing the image based at least partially on the mouth image position data and a sound recognized in the voice information during the recognizing step, wherein all of steps a)–e) are performed.

In a preferred aspect, the identifying mouth image position data may be performed automatically by a computer processor. Alternatively, the identifying mouth image position data may be at least partially performed by a human and may comprise: viewing the image; marking the image at the edges of the mouth image; and identifying the mouth image position data based at least in part on the marking. The viewing may comprise viewing the image on a computer monitor, and the marking may comprise controlling a pointer on the monitor with a mouse.

In another preferred aspect, the morphing may comprise: accessing an information database containing a plurality of instructions for morphing a mouth image based on different sounds recognized during the recognizing step; obtaining an instruction from the information database for morphing the mouth image corresponding to the sound recognized in the voice information; and morphing the mouth image based at least partially on the instruction. The morphing may further comprise morphing the image such that a non-mouth-image portion of the image is morphed depending on the morphing the mouth image. The information database may comprise at least 20 different instructions corresponding to different sounds recognized during the recognizing step.

In another preferred aspect, the morphing may comprise morphing the image at a refresh rate of at least 5 times per second, and wherein the method further comprises displaying the morphed image at the refresh rate so as to display a virtual video.

According to another preferred embodiment of the present invention, a method for creating a virtual video may comprise at least one of steps a)–e): a) creating a plurality of images of a face of a person, wherein at least one image is a base face image and at least one image is a sound face image, wherein each sound face image corresponds to a different sound face, wherein a sound face is a face that the person makes when the person makes a particular vocal sound; b) ending the plurality of images to a receiver via an information line; c) sending voice information to the receiver via an information line; d) recognizing the voice information; and e) creating a virtual video of the person speaking based at least partially on the plurality of images and a sound recognized in the voice information during the recognizing step, wherein all of steps a)–e) are performed.

In a preferred aspect, at least one image may be a high-resolution base face image and at least one image may be a low-resolution sound face image, wherein the creating the virtual video may comprise morphing the high-resolution base face image based on the low-resolution sound face image when a sound corresponding to the low-resolution sound face image is recognized in the voice information during the recognizing step.

In another preferred aspect, the method may further comprise inciting the person to create an instruction function having an input corresponding to a sound recognized during the recognizing step and an output corresponding to a sound face image, and wherein the creating the virtual video may further comprise: inputting the sound recognized during the recognizing step into the instruction function; and receiving an output corresponding to a sound face image from the instruction function. Further, the inciting may comprise: inciting the person to speak a series of words; measuring the speaking sound of the person speaking the series of words; imaging the face of the person speaking the series of words; recognizing the speaking sound so as to identify a plurality of particular vocal sounds; and relating, during creation of the instruction function, each of the particular vocal sounds with an image of the face of the person at the approximate time the each of the particular vocal sounds was made.

DETAILED DESCRIPTION OF PREFERRED EMBODIMENTS

Figure 1:
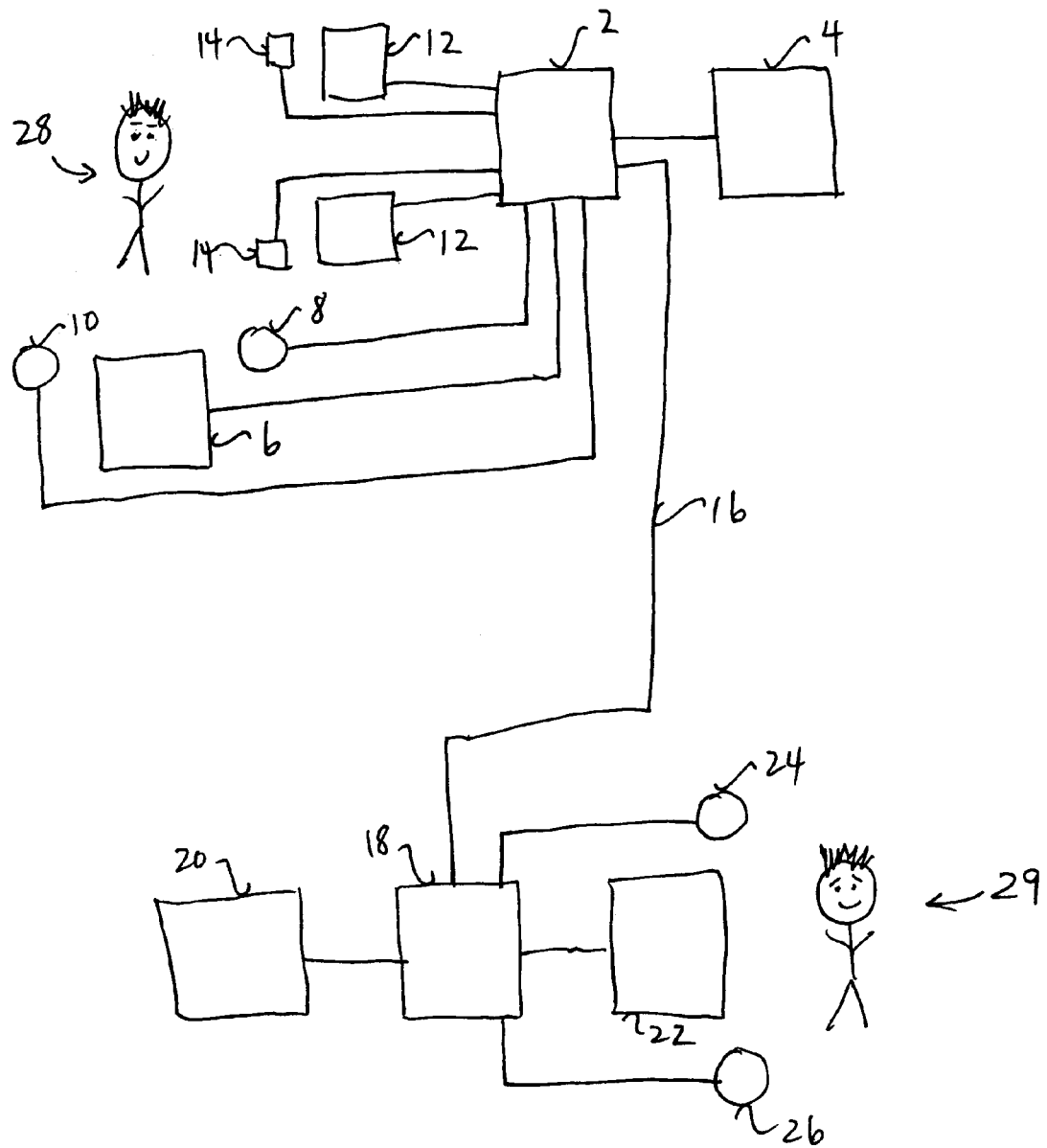
FIG. 1 is a schematic diagram of a system according to one embodiment of the present invention.

Herein is described a new technology that can provide an artificial or virtual real-time high-resolution, high-refresh-rate video of a person or object at one end of a digital information line to a person at another end. The digital information line could be any line through which digital information can be sent, such as a phone line, DSL, cable, ethernet, or other network connection.

The effect and benefit of the technology is now described by way of an example. Two people in different cities are connected by way of an internet connection. They want to talk to each other over the connection and hear each other's voices. More importantly, they want to see each other's faces, as if to see a live real-time video of each other's faces while they speak. Perhaps they know each other, and want to see each other's facial expressions. Or, perhaps they just met on the internet, and want to see what each other looks like by way of video. The first person, a man, sends a high-resolution digital picture (perhaps a 3-D picture), such as 10 megapixel, of himself to the second person, a woman, by uploading the picture to a server and asking the woman to download the picture from the server. Because of their low bandwidth internet connection (e.g., via dial-up), it takes a few minutes to successfully send and receive the picture. Next, the man sets up a digital video camera apparatus, connects it to his computer, and aims it at his face. The digital camera creates digital image data, such as a series of digital photos. The digital camera, in one embodiment of the invention, need not be a high-resolution camera. Next, the man starts a software (according to the present invention), which may herein be called the sender software, running on his computer. The sender software analyzes the image data of each image from the video camera and generates a set of location or image position data corresponding to locations of several important features of the image (also known herein as "identifiable image points"). This location data is then sent via the internet connection to the receiver (in this case, the woman). Because the sender software picked out only certain important features of the image and generated location data for these features, the location data sent via the internet connection is far less dense than the total image data created by the digital video camera. This location data is then analyzed by software, which may herein be called the receiver software, running on the woman's computer. The receiver software picks out the corresponding important features in the high-resolution photograph and subsequently morphs the man's high-resolution photograph so that the locations of these important features on the high-resolution photograph correspond to the location data received from the sender (the man in this case). The software also morphs the remainder of the photograph (the parts of the photograph not picked out as important features) to correspond with the location data received (of the important features). Thus, the morphed photograph may look like a normal, natural picture of the man, with the locations of the photograph's important features corresponding to the location data. This morphed photograph is displayed on the woman's computer screen. The location data is generated and sent by the sender at a high refresh rate, such as 30 frames per second, and the high-resolution photo is morphed at the same rate, to create the illusion of a real-time video. Thus, when the man smiles, the photograph of the man appearing on the woman's computer screen also appears to smile. When the man moves or turns his head, the photograph of the man also appears to turn its head. Most importantly, the movement of the man's mouth while he speaks is automatically choreographed with the morphed photo on the woman's computer screen, so it appears that a video of the man's speaking face is on her computer screen.

The technology may comprise: an imager, such as a digital video camera, to create digital video data; sender software to extract important information from the video data; and receiver software to morph a high-resolution photograph based on the important information extracted from the digital video data. The sender and receiver are separated by an information line, such as a phone line, sufficient to carry the important information extracted from the digital video data.

The technology works by effectively morphing a high-resolution photograph (e.g., a 10 Mpix 3-D photo of someone's face) using a relatively small number of commands or instructions, all of which can easily travel over a low bandwidth line. There are several ways to do this.

In one embodiment, a high-resolution 3D photo is sent from a sender to a receiver via an information line, such as a phone line. Using, e.g., one to five (or more) inexpensive digital cameras or video cameras, the sender's face is imaged. This digital image/video is analyzed by the sender software and a relatively small number of points (small compared to the number of pixels in the high-resolution photo and, possibly, small compared to the number of pixels in the digital image created by the digital cameras), such as important features of the sender's face, are located on the image of the sender's face and their positions determined. These located points correspond to identifiable points (i.e., points identifiable by the sender software during analysis), such as location of pupils, edges of the mouth, nostrils, edges of the face and ears, eyebrows, etc.

Figure 2:
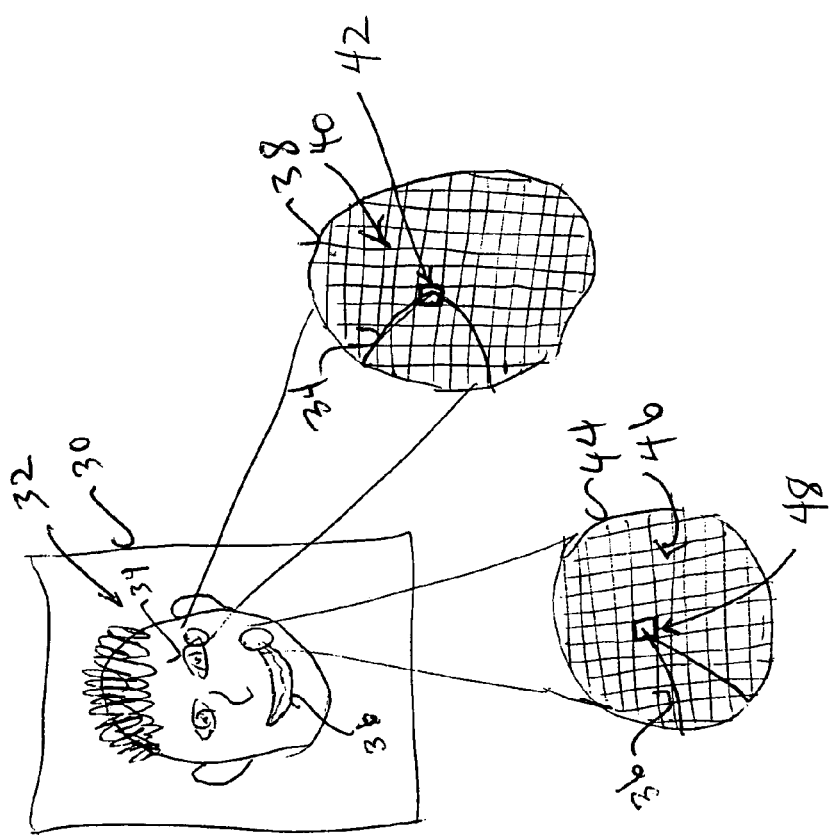
FIG. 2 shows a digital photograph, showing enlargements of two portions of the photograph.

The software can identify these points by, e.g., comparing the image of the sender's face with another photograph of the sender, or a generic photograph of a human face. Or, the software can be armed with information about the general shape of a human face, and can search for particular features (e.g., a pupil or the edge of a mouth) by measuring color variations or color variation rates in the image. For example, to find an edge of the mouth, the software can be armed with the approximate location of a human mouth with respect to the rest of the head. Using a simple edge-finder algorithm, the software can determine the outline of the head. Then, the software can find the exact location and edges of the mouth using another edge-finder algorithm, coupled with the approximate location of the mouth with respect to the head. It will be apparent to one skilled in the art how to create software to identify and locate particular human features in an image of a human face. For example, FIG. 2 shows a high-resolution image 30 of a face, with two regions blown up to show the edges of the mouth and right eye, with respect to the pixel grid of the digital photo. Either the sender or receiver software, using the method described above or methods well known in the art, identifies and locates several (such as 20 or 100 or more) important features of the face photo. Two such features, and their corresponding locations, are shown in FIG. 2. In FIG. 2, the right edge of the mouth is located at pixel $(x,y)rem,hrp$ (shown with reference number 48), and the right edge of the right eye is located at $(x,y)rere,hrp$ (shown with reference number 42). A similar method may be used to identify and locate similar or the same important features in the digital images of the sender's face taken by the sender's camera. This information is then included in the location data sent to the receiver. For the two features just discussed and shown in FIG. 2, the corresponding pixels in the digital image will then be located at $(x,y)rem,image$ and $(x,y)rere,image$. The receiver software will then morph the high-resolution photo so that $(x,y)rem,hrp=(x,y)rem,image$ and $(x,y)rere,hrp=(x,y)rere,image$ (and any other correlations for other important features). Then, the receiver software will morph the rest of the high-resolution photo to make it appear as the sender's natural or normal face.

The five cameras are preferably located a few inches apart, so that each of the located points on the sender's face are located with at least two cameras, thus providing a 3D localization of each of the points. (A 2D localization of each of the points could, in principle, be performed using only one camera. However, because low resolution digital cameras are very inexpensive, a much better 2D point localization can be performed with more than one camera.) The timed position data of each of these located points is then sent to the receiver over the low-bandwidth information line. The receiver has receiver software, which then intelligently morphs the 2D or 3D high-resolution photo based on the received position data of the corresponding located face points. For example, the position of each of the important features on the high resolution photograph is force-related to the position of the corresponding located points based on the received position data. It then appears to the receiver that she is seeing a live, high-resolution video of the sender talking, but in reality it is just a morphed photo. Clearly, the sender's voice would sound with the movement of the high-resolution photo.

A 3D localization of each of the important features on the sender's face can be generated by making sure that each important point is imaged by at least two cameras. For example, assume that two cameras, spaced apart by a known distance, each image the right edge of the sender's mouth. The sender software then identifies and locates the right edge of the sender's mouth on each image, and correlates them. By simple triangulation, the software can then determine the 3D location of the right edge of the sender's mouth relative to the two cameras. A better approximation can, of course, be obtained by imaging each important feature with more than two cameras (or more than one camera in the case of 2D localization).

With currently available technology, a low-resolution version (low resolution in the sense that few facial points are located) can be developed and sold, including the software and cameras. In the low-resolution version, low resolution cameras can be used that only locate relatively large, important features of the sender's face. Further, a high-resolution version could also be developed that uses high-resolution imagers and locates a large multitude of relatively small features of the sender's face, such as pores, moles, and hairs, perhaps in addition to the large features. The high-resolution version could be sold to, e.g., businesses that want to create an entire virtual meeting room for members of offices around the globe. Using a laser and light receiver system, the laser could be vibrated very quickly in a manner that effectively scans the entire face, with a high resolution and refresh rate. Thus, the position of every pore (or other tracking point) could be accurately tracked, and these points could be force-related to corresponding points in the high resolution photo. The laser should be able to track the pores faster than they are capable of moving (or else, from frame to frame, the computer may "lose track" of each pore). If this data is then too dense to send over the phone line, a compressed, simpler version could be created by the speaker's computer, and the simpler information (e.g., condensed to 100 or 1000 located points at a feed rate of 5 to 30 fps) could be sent to the receiver.

In one embodiment of the invention, the following steps may be executed, not necessarily in this order:

a) A high-resolution photo/image of the sender is taken;
b) The high-resolution photo/image is sent to the receiver;
c) Either the sender software or the receiver software identifies and locates important or "identifiable" features in the high-resolution photo (see FIGS. 2, 3a, and 3b);
d) A digital image (such as a single image of a 30 fps video) of the sender is generated;
e) The sender software identifies and locates the same or similar important/identifiable features in the digital image as in the high-resolution image;
f) Location data of the positions of the important/identifiable features in the digital image are sent to the receiver;
g) The locations of the important/identifiable features in the high-resolution photo are moved according to the received location data;
h) The remainder of the high-resolution is altered or morphed accordingly to generate a normal-looking photo such that the locations of the important features in the high-resolution photo correspond to the received location data.
i) Any of the above steps may be repeated to generate a virtual video of the sender.

An example of the location or image position data sent by the sender to the receiver may look something like the following, where each instance of (x,y) represents some distinct pixel coordinate: "Right edge of right eye=(x,y); Left edge of right eye=(x,y); Right edge of mouth=(x,y); Bottom middle edge of mouth=(x,y); Bottom edge of ear lobe=(x,y); etc . . . "

The sender software may determine the location of each of the important features in the digital image in one of at least two ways. First, it may go through the process of identifying and locating each of the important features in each and every frame. This is based on the fact that each of the important features is substantively different (distinguishable). For example, the right edge of the mouth is substantively different from the left edge of the mouth, because the right edge of the mouth is located on the right side of the face. This process is therefore called point or feature differentiation. A problem with this version is that it may require substantial processing power and speed. (However, as computers become faster, this may not be a problem at all.) Second, the software may go through the process of identifying and locating each of the important features just once and then subsequently tracking the location of the features. Tracking a point or feature is based on the following principle. For a given refresh time (for 30 fps video, the refresh time is about 1/30 second), there is a limited distance that any given pixel or feature can move from one frame or image to the next. Thus, if a certain feature, such as the right edge of the mouth, is located at pixel (x,y) in one frame, then the software can look for the same feature in the next frame somewhere within the pixels designated by (x−Δx to x+Δx, y−Δy to y+Δy), where Δx and Δy represent the maximum distance (in the frame or image) that a feature (as imaged in the frame or image) could move in the refresh time. Whenever the object being tracked moves too fast, or when one of the important features disappears from the image, the software can then again go through the process of identifying and locating each of the important features. This may save on the amount of processing needed.

For features that are not very important or characteristic, such as pores, hairs, moles, or other skin colorations, it may be very difficult to continuously identify and locate these features, because they are so similar to each other. For example, two pores, located 1 mm apart and appearing almost identical, may be very difficult to differentiate. Therefore, for some high-resolution applications, as discussed previously, point or feature tracking may be necessary, by itself or in addition to point or feature differentiation. In this high-resolution embodiment, point tracking could be used as follows. In a first digital image, the locations of all the features (even small, relatively insignificant features, such as pores) could be determined. Because one pore may look like many others and it may be difficult to distinguish between them, the location data of all the features in the digital image may be force-correlated to corresponding points in the high-resolution photo, with the locations of these corresponding points subsequently moved according to the received location data as if they were the actual features imaged (e.g., pores). For example, a pore on the face of the sender is imaged as pixel (x,y)pore,image, the right edge of the mouth is located as pixel (x,y)rem,image, and the right edge of the right eye is located as pixel (x,y)rere,image. The pore is located directly between (x,y)rem,image and (x,y)rere,image. On the high-resolution photo the receiver software identifies and locates the right edge of the mouth as pixel (x,y)rem,hrp, and the right edge of the right eye as pixel (x,y)rere,hrp. Because pores are so similar and close together, the receiver software has no way of locating the exact same pore identified and located in the digital image of the sender. Therefore, a point in the high-resolution photo directly between (x,y)rem,hrp and (x,y)rere,hrp is chosen to be (x,y)pore,hrp. Just as the locations of (x,y)rem,hrp and (x,y)rere,hrp are changed according to the received location data (where the data includes (x,y)rem,image and (x,y)rere, image), the location of (x,y)pore,hrp is also changed according to the received location data (where the data also includes (x,y)pore,image). Thus, even though pores are hard to distinguish (thus possibly ruling out further point differentiation techniques), each pore, once located, can be tracked using point tracking, and their positions included in the location data received by the receiver.

The locations of the important features of the high-resolution picture could be moved directly to the locations of the important features of the digital image, according to the received location data, as demonstrated above. However, there may be additional processing involved. For example, because the digital image likely has a much lower resolution than the high-resolution photo, there may not be a direct mapping of pixels from the digital image to the high-resolution photo. For example, if the high-resolution photo has 25 times the resolution as the digital image, then pixel (x,y) in the digital image may correspond to pixel (5x,5y) in the high-resolution image. Besides enlargement or reduction in size, other operations (such as rotation, etc.) may be performed on the received location data before correlating it to the locations of the important features in the high-resolution photo. Such operations are well known in the art.

Figure 4A:
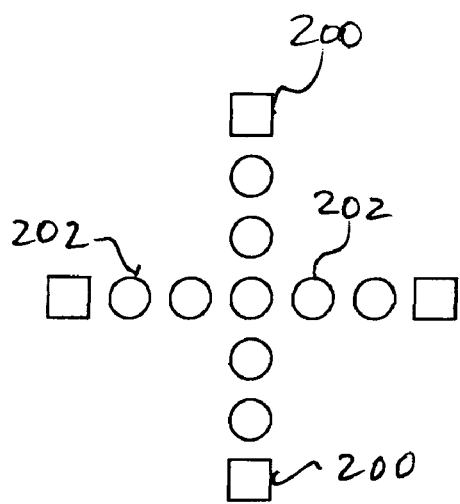
FIGS. 4a and 4b show the relationship between certain identifiable image points and remaining points.
Figure 4B:
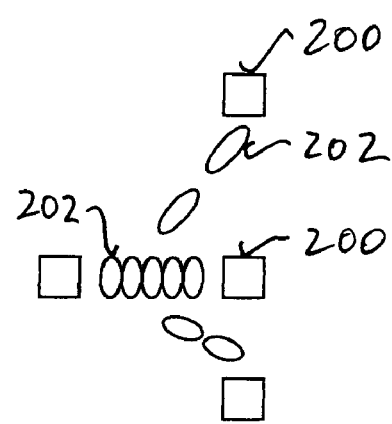

While locations of the important features of the high-resolution picture could be moved directly to the locations of the important features of the digital image, the remaining pixels in the high-resolution photo cannot. They must, therefore, be morphed using an intelligent software. The remaining pixels could be moved partially as a function of the movement of the locations of the important features in the high-resolution photo (according to the received location data), and partially as a function of their location relationship to each other and/or the important features in the original high-resolution photo. An example is shown in FIGS. 4a and 4b. FIG. 4a shows four important features/pixels (signified by squares 200) and nine remaining pixels (signified by circles 202) in an initial configuration in the high-resolution photo. In FIG. 4b, the positions of two of the four important features 200 have changed, corresponding to the received location data. Specifically, the right feature 200 has moved to the left three pixels and the bottom feature 200 has moved up one pixel. As a result, the positions of the nine remaining pixels 202 have also moved as a function of the movement of these squares 200, and also as a function of their relationship to each other. Thus, the remaining pixels 202 are either "squashed" or "stretched" depending on the movement of the important features in the high-resolution photo. FIGS. 4a and 4b are only an example. Implementation of this embodiment will be clear to one skilled in the art.

For example, a block of pixels having a certain color that is squashed actually results in a smaller block of pixels having that color; conversely, a block of pixels having a certain color that is stretched actually results in a larger block of pixels having that color. There are many possible algorithms that could morph a picture to make it look "correct" or "normal," given that the locations of its important features are moved according to the received location data. As an example of such an algorithm, positions of the remaining pixels 202 may be moved as a function of movement of nearby important features 200 and/or as a function of movement of nearby remaining pixels/features 202. For example, if a remaining pixel rp1 in the high-resolution photo is located a distance d1 from an important feature that is moved (according to the received position data) a vector v1, and is located a distance d2 from an important feature that is moved a vector v2, then the remaining pixel rp1 may move a vector vrp1 that is proportional to some function $f=f1(v1)*f2(d1)+f3(v2)*f4(d2)$, where $f1(v1)$ is a function of v1, $f2(d1)$ is a function of d1, and so on. Further, the dependence function f may include information about other, or perhaps all, important features. Further, the dependence function f may include information about other or all other remaining points. There are many other ways that an algorithm could alter the positions of the remaining points to make a picture look "normal," given the alteration of positions of the important features in the high-resolution photo according to the received location data. Such algorithms will be obvious to one skilled in the art and need not be explained in further detail to understand the scope of the present invention.

The invention is not limited to virtual video of a human face. It can be used for creating a virtual image or video of any object, as will be obvious to one skilled in the art. Further, it can be used to create a 2D video or a 3D video. Further, because sometimes the sender's teeth and tongue are exposed while talking, the sender may also send a high-resolution photo of him smiling, showing his teeth, etc., and the receiver software can intelligently morph the original high-resolution photo to include the teeth portion of the other high-resolution photo (the one of him smiling) whenever the received location data indicates that his lips are spread open. Further, two parties over an internet connection can simultaneously be sending and receiver information, so that they each see a real-time virtual video of the other.

In another embodiment of the present invention, the high-resolution photograph of the sender's face is morphed using voice recognition software, either without or in addition to location data received from the sender. In this embodiment, either the sender or receiver software includes voice recognition software. Depending on the sounds created by the sender in speaking, the mouth part of the high-resolution photo (or the whole photo) is morphed to correspond to the sounds made by the sender. This can be done in several ways.

For example, the sender may send a package of high-resolution pictures including the position of his lips when he says certain consonant or vowel sounds, and these can be integrated together to morph the primary high-resolution image as the speaker speaks. For example, the software may prompt the sender to say a sentence containing all the usual vowel and consonant sounds, and a digital camera or video camera may image him saying this sentence. Then, the software chooses the specific (preferably high-resolution) photos from the video that correspond to his lip/mouth/teeth/tongue arrangement at each of the vowel and consonant sounds. The software then, using edge-finder software or other means obvious to one skilled in the art, cuts out the lip/mouth/teeth/tongue portion of these photos. The original high-resolution photo, as well as these lip/mouth/teeth/tongue portions, are then sent to the receiver. As the sender speaks, the high-resolution photo is then morphed by the receiver software by superimposing the necessary lip/mouth/teeth/tongue portion onto the high-resolution photo and then adjusting the high-resolution photo to make it look normal. Or, the high-resolution photo is morphed based on the relative positions of lip, teeth, tongue, etc. in the correct lip/mouth/teeth/tongue portion for the sound being created by the sender.

Consider this example. The sender, in programming his own sender software, videos himself saying the word "net." The software, using voice recognition, recognizes that the three sounds "n," "e," and "t" were created. Then, the software breaks up the video into at least three images, each image corresponding to the lip/mouth/teeth/tongue arrangement for each sound. Then, in an optional step, the sender software cuts out only the lip/mouth/teeth/tongue portions of these sound images. Then, it sends the high-resolution photo and these lip/mouth/teeth/tongue portions to the receiver. Consider that the sender is now saying the word "ten" (which is made up of three sounds and corresponding lip/mouth/teeth/tongue arrangements: "t," "e," and "n"), which sound is transmitted to the receiver via the internet connection. The receiver software includes voice recognition software that identifies the three sounds "t," "e," and "n." (Instead, the sender software could have identified the three sounds, and sent this identification information to the receiver with the "ten" sound made by the sender.) Next, the receiver software starts with the original unmodified high-resolution photo. Then, it finds the "t" lip/mouth/teeth/tongue portion in the plurality of lip/mouth/teeth/tongue portions received from the sender. Then, it either superimposes the "t" lip/mouth/teeth/tongue portion onto the high-resolution photo and "cleans it up" (as discussed with respect to a previous embodiment) to make the modified high-resolution photo look normal, or the software directly modifies the lip/mouth/teeth/tongue portion of the high-resolution so that relative positions of the lips, tongue, teeth, etc. correspond to the same relative positions in the "t" lip/mouth/teeth/tongue portion. The software then does the same method for the "e" and "n" sounds, and puts the three modified high-resolution photos in the proper timed order. Depending on how fast the word "ten" was said by the sender, the software may have to cut out some sound frames, or multiply some sound frames, so that the resulting video is choreographed with the sender's speaking the word "ten." The net result is a video in which it appears that the sender's lips, mouth, tongue, etc. are moving in sync with the words being spoken by the sender. On the receiver's computer screen, she sees the high-resolution photo of the sender appearing to say the word "ten," while at the same time hearing the sender's voice say "ten" through speakers connected to her computer. Variations on this general concept will be obvious to one skilled in the art and are included in the invention. For example, either the sender software or receiver software may identify the edges of the lip/mouth/teeth/tongue portion on the high-resolution photo.

In another embodiment, the receiver's software can simply be very intelligent; it may include information on how to morph the lip/mouth/teeth/tongue portion of a photograph depending on the sounds being made and recognized by the voice recognition software. For example, the relative motion of people's lip/mouth/teeth/tongue when they speak is relatively constant and well-known in the art of linguistics. Thus, the receiver software may begin with the high-resolution photo of the sender. After it identifies the edges of the lip/mouth/teeth/tongue portion of the high-resolution photo, and after it identifies the individual sounds made in the sender's speech, the receiver software can then access a database of information which tells how to morph the lip/mouth/teeth/tongue portion of the high-resolution photo for each sound made in the sender's speech. This embodiment is likely the least expensive embodiment, because it requires only one (or a small number of) high-resolution photo to be sent to the receiver, and does not require the sender to be monitored with a video camera or set of cameras. However, because it only modifies the high-resolution photo based on sounds made and recognized, the dynamics of the video created by the receiver software are limited, and will not accurately represent the actual facial expressions made by the sender while he speaks.

The present invention may include methods, systems, apparati, and software-containing media for the implementation of the above described technology.

The present invention will now be described with respect to FIGS. 1–7. Referring now to FIG. 1, a system according to an embodiment comprises a first storage medium, such as a disk or hard drive 4, a first monitor 6, a first mouse 8, a microphone 10, at least one (and preferably two or more) high resolution cameras 12, and at least one (and preferably two or more) low resolution cameras 14, all connected to first computer processor or central processing unit (CPU) 2. The system also comprises a second CPU 18 connected to a second storage medium 20, a second monitor 22, a second mouse 24, and speakers 26, where the first and second CPUs 2, 18 are connected via an information line 16. A user 28 may interact with the CPU 2 via monitor 6, mouse 8, microphone 10, and cameras 12, 14. A recipient 29 may interact with the CPU 18 via monitor 22, mouse 24, and speakers 26.

The CPUs 2, 18 are well known in the art, and can include any machine, mechanical and/or electronic, configured to perform operations or programs based on code or instruction information. Storage media 4, 20 are also well known in the art, and may include any device capable of storing information, such as magnetic or optical disks. Further, as discussed previously, the "sender software" may be located on the first storage medium 4 and run on the first CPU 2, and the "receiver software" may be located on the second storage medium 20 and run on the second CPU 18. Mice 8, 24 are also well known in the art, and may include any information input device, such as a keyboard, touchpad, stylus, etc. Microphone 8 is a convention microphone, allowing sound information to be input and processed by CPU 2. Speakers 26 are conventional speakers, allowing sound information to be generated from electrical signals from CPU 18. High resolution cameras 12 are digital cameras (preferably color cameras) preferably having a resolution in excess of 100 kilobytes (kb), preferably greater than 1 Mb. Low resolution cameras 14 are digital cameras preferably having a resolution less than 1 Mb, and preferably less than the resolution of high resolution cameras 12. Also, preferably both low- and high-resolution cameras 14, 12 are video cameras having refresh rates of, preferably, at least 5 times per second, more preferably at least 15 times per second, and more preferably at least 30 times per second. Alternatively, low-resolution and high-resolution cameras 14, 12 may be combined into a medium-resolution camera, so as to avoid the need for so many cameras. Further, only one of each low-resolution and high-resolution camera 14, 12 may be needed, in the embodiment in which the virtual video created on the monitor 22 of the recipient 29 is only two-dimensional. There may be two (or more, in the case of better resolution and better image coverage) of each of low-resolution and high-resolution cameras 14, 12 in the embodiment in which the virtual video created on the monitor 22 of the recipient 29 is three-dimensional. The face information line 16 is well known in the art, and can include an electronic or optical phone line, a cable line, a network or Ethernet line, or a wireless connection (such as sound waves, radiofrequency, infrared, satellite, etc.). Further, information line 16 may be connected to other computers, a network, etc. (not shown).

Referring now to FIG. 2, a digital photograph image 30 includes a face image 32 of a person, the face image 32 including an eye image 34 and a mouth image 36. A right-side portion of the eye image 34 is exploded in view 38, showing pixels 40. The right edge of the right eye (RERE), in image 30, happens to fall in pixel 42. The RERE is an identifiable image point, because it is qualitatively different from other points in the image 30. Because of its absolute location in the image 30 (e.g., a central right portion of the image 30), its relative location in the image 30 (e.g., above the right edge of the mouth, as indicated by pixel 48), and its brightness and/or color contrast to at least some points surrounding it, the RERE may be identified as such by a properly programmed computer. As another example, a right-side portion of the mouth image 36 is exploded in view 44, showing pixels 46. The right edge of the mouth (REM), in image 30, happens to fall in pixel 48. Again, a properly programmed computer will be able to differentiate REM from other points in image 30. Further, after the RERE and REM (identifiable image points) are identified as such, their locations as falling within pixels 42 and 48, respectively, can be determined.

Further, the image 30 in FIG. 2 may represent the image 30 (such as a high-resolution image) sent to recipient 29 for morphing by CPU 18 to create a virtual video according to the present invention. (For clarity of explanation, the "morphable" image may be referred to as the "high resolution" image, and images necessary to determine the position of user 28 may be referred to as the "low resolution" images, but they may be the same or reversed in their resolution.) Alternatively, the high-resolution image may have already been sent to recipient 29, so that the image 30 in FIG. 2 may be a low-resolution image as taken by low-resolution video camera 14 for the purpose of determining the position of user 28. In such a case, the positions of identifiable image points RERE and REM (corresponding to pixels 42, 48, respectively) also correspond to positions of corresponding identifiable object points RERE and REM of the object (i.e., the face 32 of the person).

Figure 3A:
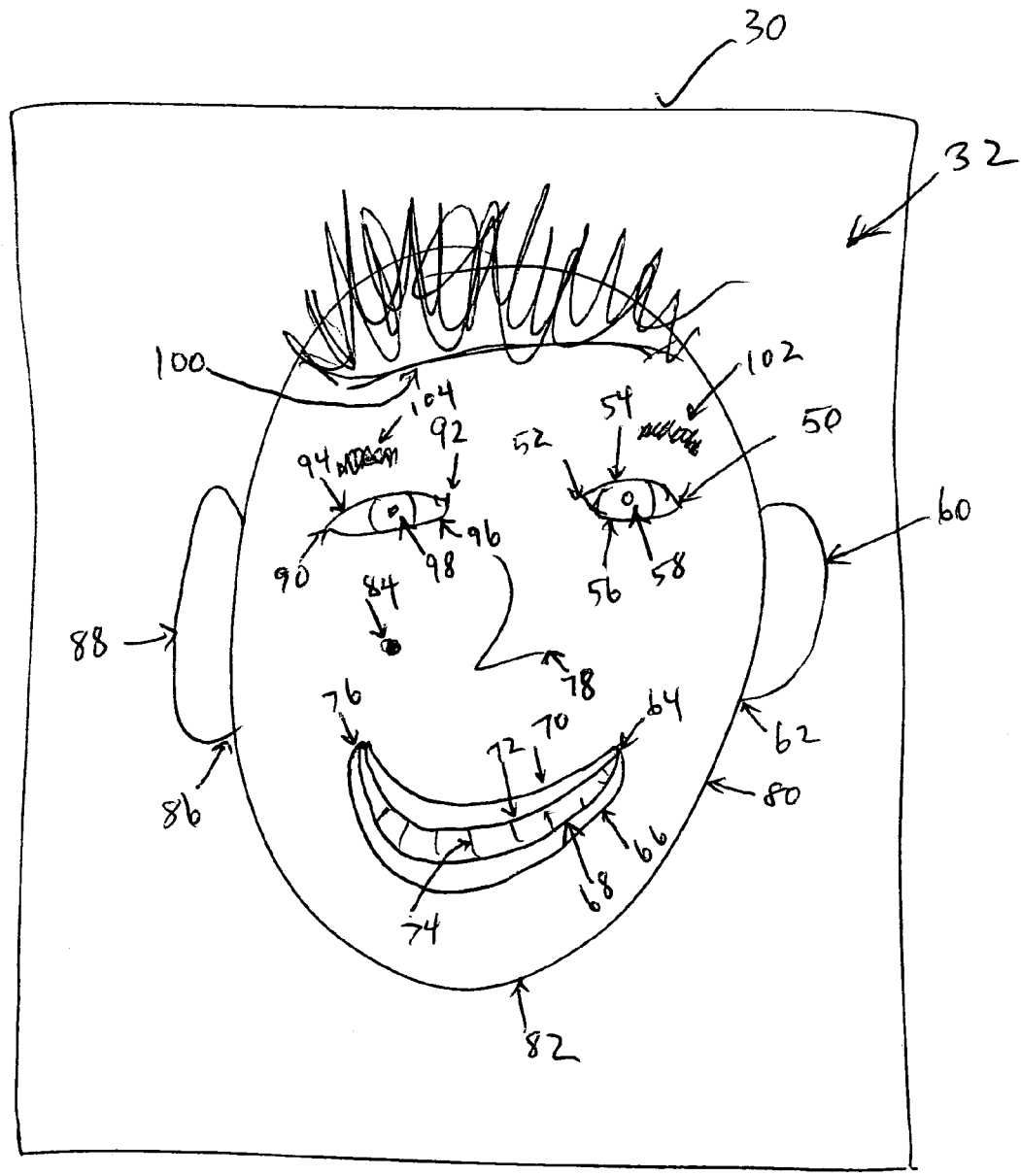
FIGS. 3a and 3b show different photographs having identifiable image points.
Figure 3B:
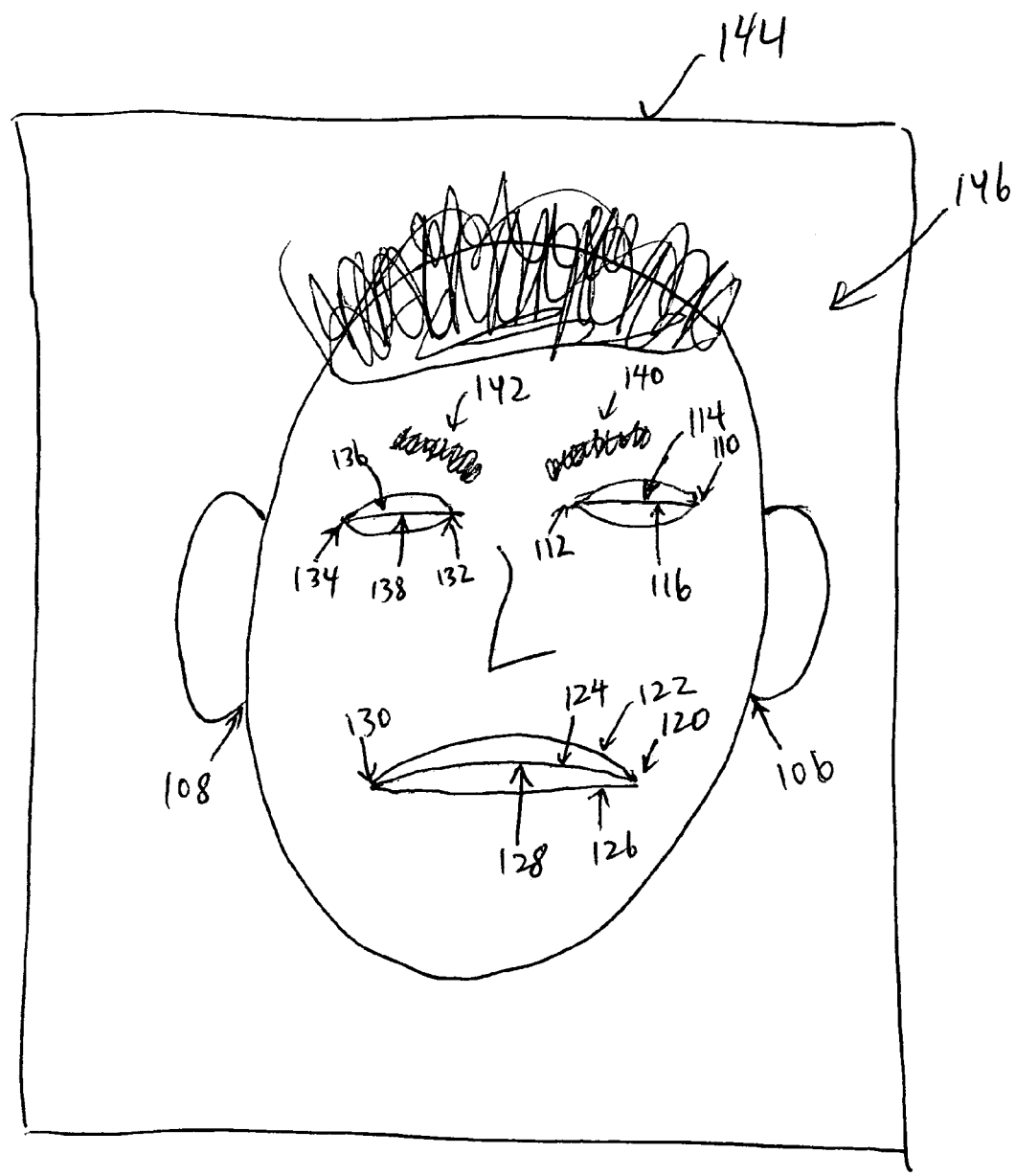

To clarify, the user 28 has a face having many identifiable object points, such those shown, e.g., in FIGS. 3a and 3b. Among them are the right edge of the person's right eye, or RERE, and the right edge of the his mouth, or REM. When the face of the person 28 is imaged by low- or high-resolution video camera(s) 14, 12, image 30 is formed by CPU 2. The image 30 then contains corresponding identifiable image points RERE, REM, corresponding to identifiable object points RERE, REM on the person's face. When the computer identifies these identifiable image points as such, through edge-finding and other intelligent methods as discussed herein, their locations within the image (i.e., their being located within pixels 42, 48, respectively) is determined as image position data of these identifiable image points. But the image position data of these identifiable image points RERE, REM also correspond to the object position data of the corresponding identifiable object points RERE, REM. In other words, if user 28 moves to the left relative to the video camera(s) 14 from one frame to the next, then (all else being equal) the identifiable object points (such as RERE and REM) on his face will also move left, and their object position data will change. Further, the face 32 in image 30 in the second frame will shift left relative to the face 32 in image 30 in the first frame, so that the image position data of the corresponding identifiable image points RERE, REM will change from one frame to the next in a manner corresponding to the already described change in the object position data of the corresponding identifiable object points. Thus, even if the image position data of identifiable image points RERE, REM do not uniquely determine the absolute positions of the corresponding identifiable object points RERE, REM, they do correspond in a way that is useful, as used in the present invention.

Of course, with a high-resolution, preferably multiple camera system, the absolute three-dimensional positions of identifiable object points on the face of user 28 could be determined, such as by triangulation, as understood by one of ordinary skill in the art. However, this kind of precision is not necessary in the present invention. Thus, "determining object position data" of identifiable object points need not require determining their absolute three-dimensional positions.

Referring now to FIG. 3a, the image 30 of a face 32 may include a wide variety of possible identifiable image points (corresponding to identifiable object points on the actual face of the person), including but not limited to: right edge of right eye 50, left edge of right eye 52, upper edge of right eye 54, lower edge of right eye 56, right iris or pupil 58, right ear edge 60, right ear-face interface 62, right edge of mouth 64, lower edge of lower lip 66, upper edge of lower lip 68, upper edge of upper lip 70, lower edge of upper lip 72, tooth gap 74, left edge of mouth 76, nose-face interface 78, face edge 80, chin edge 82, mole 84, left ear-face interface 86, left ear edge 88, left edge of left eye 90, right edge of left eye 92, upper edge of left eye 94, lower edge of left eye 96, left iris or pupil 98, hairline 100, right eyebrow 102, and left eyebrow 104.

Notice that some of the identifiable image points mentioned may be single-pixel points (e.g., they fall only in a single pixel, such as the left edge of the right eye 52), while others may be edges that are multi-pixel curves or areas that cover more than one pixel (such as the face edge 80 or right eyebrow 102). The word "point," as used herein, is a generic term for an entity having a measurable location.

FIGS. 3a and 3b show how a virtual video can be created according to the present invention utilizing the identifiable image points discussed. Assume, for the moment, that image 30 is the "high-resolution" image sent to recipient 29. Next, user 28 uses the system as shown in FIG. 1 to generate a "low-resolution" image 144 of his face, as in FIG. 3b. Presumably, the same identifiable image points are identified (and their image position data determined) in image 144 as in image 30, but for the sake of clarity and simplicity of explanation, only some of those corresponding identifiable image points are shown in FIG. 3b. Notice that the image position data of some of the identifiable image points in FIG. 3b are not substantially different from the image position data of their corresponding identifiable image points in FIG. 3a. For example, left ear-face interface 108 is located in approximately the same place in image 144 (i.e., left ear-face interface 108 has approximately the same image position data) as left ear-face interface 86 in image 30. The same is true of right ear-face interfaces 106, 62, right edges of right eye 110, 50, left edges of right eye 112, 52, right edges of left eye 132, 92, and left edges of left eye 134, 90. All of these facts indicate that the orientation of face images 146, 32 has not changed from image 30 to image 144. Because of the previously discussed correlation between image position data of identifiable image points and object position data of corresponding identifiable object points, these facts also indicate that the actual location/orientation of the face of person/user 28 was (approximately) the same at the time T1 image 30 was created and the time T2 image 144 was created.

However, the image position data of other identifiable image points in image 144 is substantially different from the image position data of corresponding identifiable image points in image 30. For example, the right edge of mouth 120 in image 144 has image position data that correspond to a pixel lower than the right edge of mouth 64 in image 30. Further, upper edge of right eye 114 in image 144 has image position data that correspond to pixels that are lower than the upper edge of right eye 54 in image 30. Also, right eyebrow 140 in image 144 has image position data that correspond to pixels that are displaced relative to the right eyebrow 102 in image 30, as shown. These facts indicate that, while the location/orientation of the face of person/user 28 was not substantially different at times T1 and T2, the expression on his face was. In other words, at T1, the person 28 is happily smiling, while at T2, he is angrily frowning.

These examples are intended to illuminate how, if the face image 32 of image 30 was modified or "morphed" so that the image position data of its identifiable image points were moved to correspond to the image position data of the corresponding identifiable image points in image 144, the face image 32 in image 30 would appear similar, if not substantially the same, as the face image 146 in image 144. Of course, it would probably not be enough to alter the image position data of only the identifiable image points in image 30, but would also require altering the image position data of at least some of the remaining image points in image 30. For example, the outline of a person's face may move when one goes from smiling to frowning, so, in a similar manner, image position data of face edge 82 may need to be altered to make the morphed image 30 look more natural and correct. Intelligent software may accomplish this task.

Of course (furthering the above example), if image 30 already exists in the second storage media 20 of recipient 29, then user 28 may "send" image 144 to recipient 29, not by actually sending the raw image data of image 144 (which may be very dense), but rather by sending the image position data of corresponding identifiable image points in image 144 (which is far less dense), and letting CPU 18 morph image 30 based on the image position data of the corresponding identifiable image points in image 144. Better still, recipient 29 may be able to see a live "virtual" picture of user 28 when the image position data sent by user 28 corresponds to object position data of the corresponding identifiable object points on the face/body of the user 28. In other words, if user 28 sends recipient 29 object position data of a large number of identifiable object points on his face, in the form of corresponding image position data of corresponding identifiable image points in an image 144 of the user 28 (as determined by imaging the identifiable object points of the person's face with camera(s) 14 and subsequently identifying and locating the corresponding identifiable image points), then the recipient's CPU 18 can morph the image 30 stored in second storage media 20 so that the image 30 looks like image 144, which corresponds to the "live" image presently taken of user 28.

Referring now to FIGS. 4*a* and 4*b*, a simple method for morphing an image is shown. An image in FIG. 4*a* has four identifiable image points 200 (a top, a bottom, a left, and a right), and nine remaining image points 202. The image shown in FIG. 4*a* may correspond to a portion of a high-resolution (or "to-be-morphed") image 30 stored on the second storage medium 20 of the second person. In FIG. 4*b*, the image of FIG. 4*a* is morphed in such a way that the image position data of the left and bottom identifiable image points 200 has been altered, so that the bottom identifiable image point 200 has moved upward and the right identifiable image point has moved leftward (presumably to correspond to image position data, received from first CPU 2 via information line 16, of corresponding identifiable image points of an image taken of person 28 by camera(s) 14 and processed by first CPU 2). FIG. 4*b* demonstrates that the second CPU 18 could, and probably should, morph the remaining image points 202 depending on the morphing of identifiable image points 200. The altering of image position data of remaining image points 202 may be performed in any number of ways, as would be understood by one of ordinary skill in the art. For example, the altered image position data of a particular remaining image point 202 may depend only on the alteration of image position data of identifiable image points 200 within a particular proximity (i.e., within a predetermined number of pixels in distance), or they may also depend on the alteration of image position data of other proximal remaining image points, or they may depend on the alteration of the image position data of all identifiable image points and/or other remaining image points. Further, the mathematical dependence function may be chosen as desired, and would not require undue experimentation to find an acceptable dependence function.

For example, the dependence function may depend on proximity. For example, if the image position data of an identifiable image point is altered or moved upward in the image by 3 pixels, then a dependence function may look something like this: a) remaining image points within 2 pixels of the altered identifiable image point are moved upward by 3 pixels; b) remaining image points within 3–4 pixels of the altered identifiable image point are moved upward by 2 pixels; c) remaining image points within 5–6 pixels of the altered identifiable image point are moved upward by 1 pixel; and d) remaining image points beyond 6 pixels of the altered identifiable image point are not moved upward due to the alteration/movement of that identifiable image point. Of course, the net alteration to any given remaining image point may be the sum of the alterations due to individual altered/moved identifiable image points. For example, if a remaining image point is sufficiently proximal to a first identifiable image point which, when morphed, has image position data that corresponds to 3 pixels left, and is also equally proximal to a second identifiable image point which, when morphed, has image position data that corresponds to 1 pixel right, then the remaining image point may, on net, be morphed so that its image position data corresponds to 2 pixels left. As discussed, other dependence functions will be known or found without undue experimentation to one of ordinary skill in the art.

Figure 5:
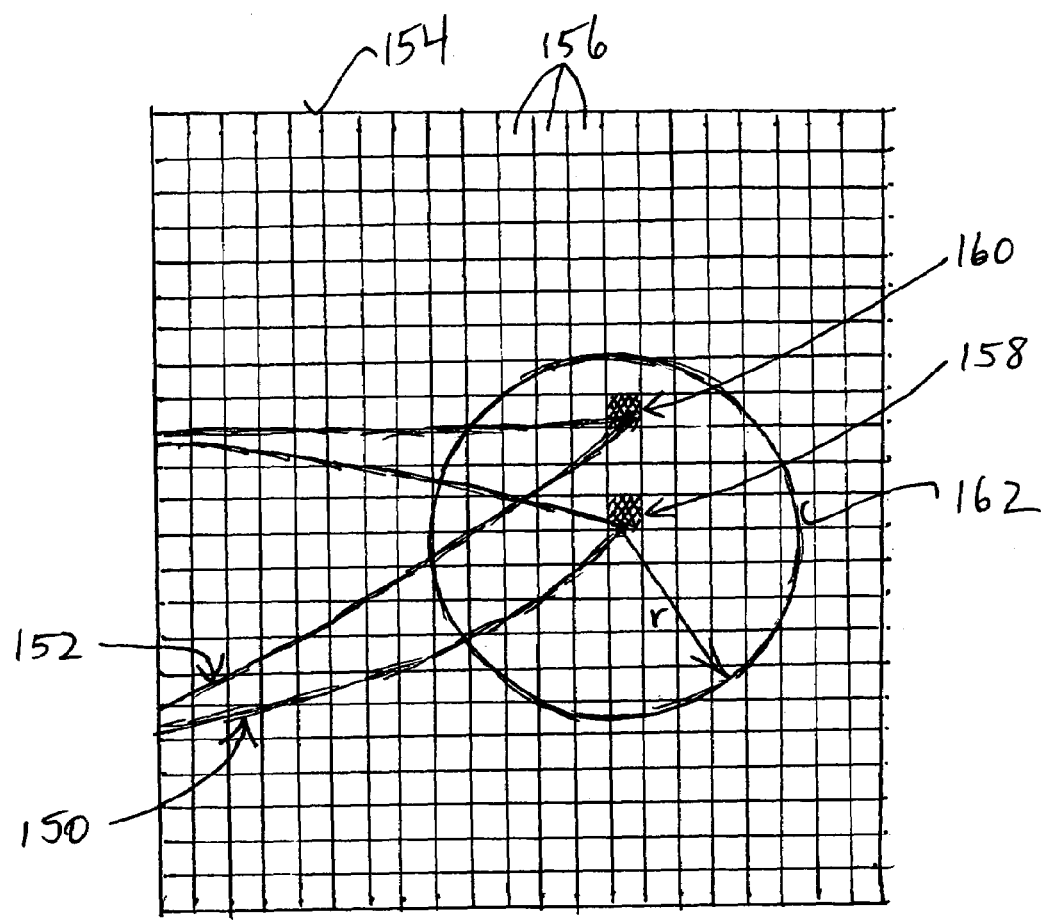
FIG. 5 shows a superimposition of enlarged, corresponding portions of two subsequent image frames.

Referring now to FIG. 5, a method of reducing necessary processing power to implement the present invention will be discussed with respect to "point tracking." In the discussion of FIGS. 3*a* and 3*b*, it was assumed that the image 144 is taken off person 28 by camera(s) 14 (or 12) and processed by first CPU to identify and locate each of the identifiable image points 106, 108, 110, 112, etc. Of course, if the present invention is used to create a virtual video having a refresh rate of 5 or more frames per second (such as 15 or 30 or more fps), the processing capability of first CPU 2 must be reasonably good, because it must perform a reasonably complex identification analysis on the entire image. A shortcut to this approach will be described with reference to FIG. 5. Point tracking is based on the conclusion that, for a given refresh rate for video camera(s) 14, the image position data of corresponding identifiable image points cannot change substantially from one frame to the subsequent next frame. For example, image 154 may be a portion of an image taken by camera 14, and is actually the superimposition of that portion of two subsequent frames. The image 154 is broken into pixels 156 and includes a first mouth edge 150 in the first frame and a second mouth edge 152 in the second frame. Of course, mouth edges 150, 152 correspond to the same mouth (i.e., the mouth of person 28), but their images are different between the first and second frames presumably because the person 28 has moved his mouth. Associated with first mouth edge 150 in the first frame is REM 158, and associated with the second mouth edge 152 in the second frame is REM 160. Because REM 160 is higher than REM 158, this indicates that person 28, from the first frame to the subsequent second frame, is in the process of turning his mouth to smile.

However, it should be clear that person 28 probably cannot move himself or his face parts (e.g., identifiable object points) faster than a certain expected speed. This expected speed, of course, corresponds to an expected image speed Se in image 156. (The units of expected speed Se may be, e.g., pixels per second.) In other words, it can be predicted that no identifiable image point (corresponding to an identifiable object point on the face of person 28) will "move" (i.e., its image position data will change) by more than a certain number of pixels per second. By knowing the refresh time Tr of the video camera 14, the total possible radius r of "movement" of an identifiable image point from one frame to the next will be r=Se*Tr. The radius r is shown in FIG. 5. Therefore, instead of searching the entirety of each image taken by camera 14 for each identifiable image point, the first CPU 2 may, instead, search for each identifiable image point only with the radius r of the corresponding identifiable image point in the previous frame. In this way, an identifiable image point is "tracked" in two subsequent images by recognizing that the image position data of the second identifiable image point (i.e., in the second frame) is likely to be within a predetermined distance of the image position data of the first identifiable image point (i.e., in the first frame).

If the identifiable image point is not found the radius r, the radius r may be expanded temporarily or permanently, or else, that particular identifiable image point simply may not be identified in that particular frame. Instead, image position data of all the other identifiable image points may be sent. As understood by one skilled in the art, every possible identifiable image point need not be identified and located in every image taken by camera 14, so long as there are sufficiently many identifiable image points such that the "to-be-morphed" or high-resolution image stored in second storage medium 20 may be acceptably morphed based on the image position data of the identified and located identifiable image points received from first CPU 2 via information line 16.

As discussed, the identification of identifiable image points can be performed using edge finding techniques, best fit techniques, etc. For example, in a best fit technique applied to the point tracking method above, if the identifiable image point to be tracked has, in the first frame, a particular color and brightness/magnitude, then that identifiable image point may be compared to all the points within radius r in the second frame to minimize the root-mean-square deviation from that particular color and brightness/magnitude. Such methods will be understood and known by those of ordinary skill in the art.

Of course, camera(s) 12, 14 may instead or in addition include a laser system having a laser and laser detector. A single laser that scans the face of the person 28 can provide an astonishingly high resolution, and may allow the identifiable object points to include very tiny points, such as pores or individual hairs or facial hairs. Of course, one problem with such high resolution is that the first CPU 2, no matter how powerful or sophisticated its running software, may not be able to differentiate between two adjacent pores. This is to be contrasted with other kinds of identifiable object points, such as the right edge of the right eye (RERE) and the right edge of the mouth (REM), which are inherently different and distinguishable by a properly programmed first CPU 2. For example, an image 30 may be matched up with a database of preexisting human face forms to help the first CPU 2 identify in the image a location to search for each identifiable image point. Then, the CPU 2 may use typical edge finding and/or best fit analyses to actually identify each identifiable image points. Other methods are known to those of ordinary skill in the art. However, it may not be obvious, in the first frame, how to distinguish two adjacent pores, as they aren't necessary inherently different enough to allow for differentiation. Therefore, the information of locations (i.e., image position data) of individual pores may be used primarily to determine the relative movement of portions of the face (as the person's facial expression changes), and this relative movement may be transmitted as image position data through information line 16 to second CPU 18. In other words, this high-resolution capability may be used to more accurately represent the contour of the person's face and its relative changes, and these changes may be sent in the form of image position data to the second CPU 18 where the "to-be-morphed" image is morphed. Scanning lasers and their capability to provide high-resolution imaging and localization are well known in the art.

Figure 6A:
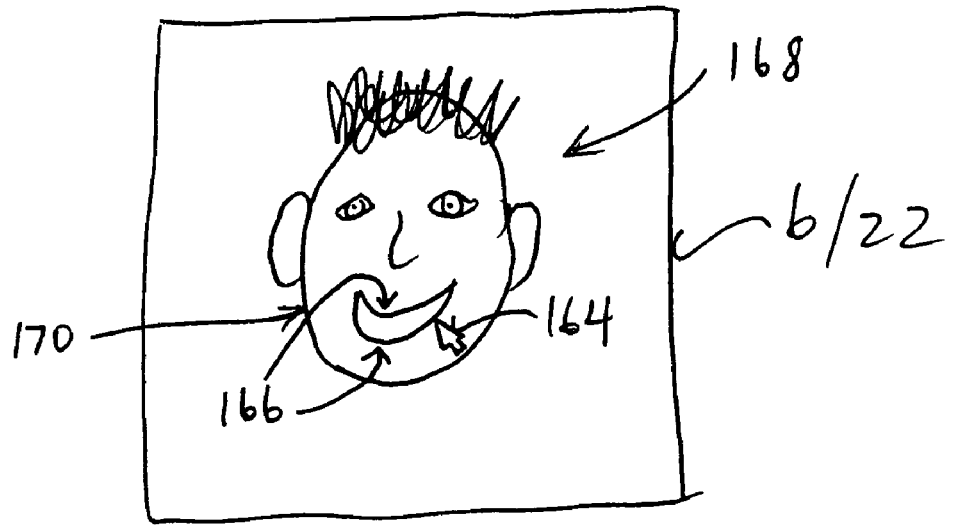
FIGS. 6a and 6b show images on computer monitors.
Figure 6B:
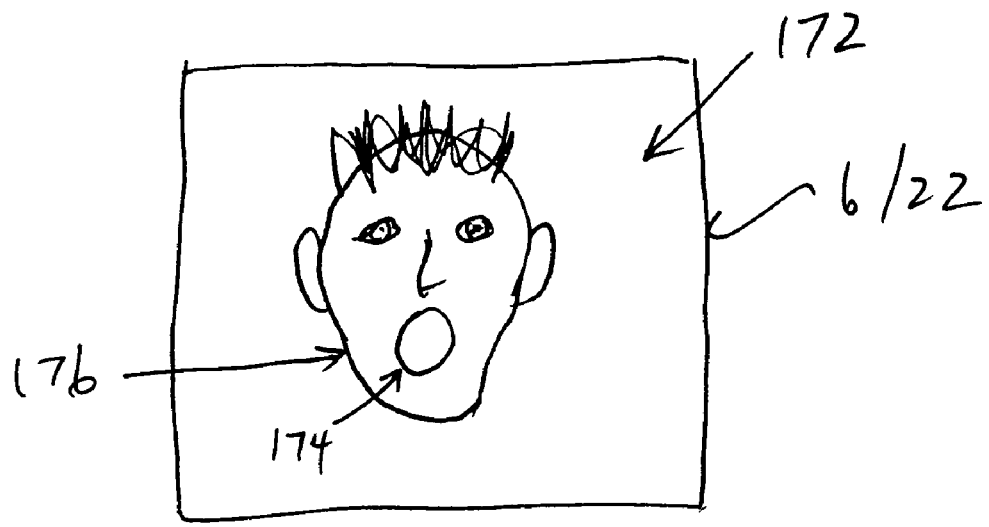

Referring now to FIGS. 6a and 6b, a different method of the present invention will be described. On monitor 6 is shown a face image 168 of the person 28 as taken by camera(s) 12, 14. The person 28, via interaction with the first CPU 2 using the monitor 6 and mouse 8, can manipulate a pointer 164 on the screen of monitor 6. The person 164 can manually identify or designate the mouth edges 166 on face image 168, such as by clicking on many points on the mouth edges 166, or by dragging the pointer 164 around the mouth edges 166, etc. The information corresponding to the image position data of the mouth edges 166 is stored in first storage medium 4, and is preferably associated with the file corresponding to the face image 168. Then, this preferably high-resolution (i.e., "to-be-morphed") image 168 is sent to the second CPU 18 via information line 16 and stored in second storage medium 20.

The software for implement this method is preferably stored on second storage medium 20 (as well as first storage medium 4). The software preferably includes voice recognition software as well as an information database including a plurality of instructions for morphing a mouth image based on different sounds recognized during voice recognition. The face image 168 can then be morphed based on these instructions, so that either just the mouth image (enclosed by selected mouth edges 166) can be morphed, or preferably the entire face image 168 can be morphed.

For example, the information database includes instructions for mapping particular voice recognition sounds to morphing algorithms. As an example, the person 28 may speak into microphone 10. This voice information is preferably digitized by first CPU 2 and sent to second CPU 18 via information line 16 (although it could be a different information line). The second CPU 18 runs the voice recognition software stored in second storage medium 20 and converts the digitized voice information into recognized sounds. For example, assume that the person 28 is making an "o" sound. The second CPU 18 recognizes this sound as "o" and looks up this sound on the information database. Corresponding to this sound in the information database is an instruction, e.g., to "raise the upper mouth edge, lower the lower mouth edge, bring the left and right edges closer together, and round off rough edges," or something of that nature. This is simply a verbal example, and the instructions, of course, are likely dimensional instructions, in that they offer specific numerical changes to the image position data of mouth edges 166. The CPU 18 then applies these instructions to the stored high-resolution face image 168 to arrive at the morphed face image 172 having morphed mouth edges 174, as shown on the second monitor 22. Further, a more sophisticated software may include instructions for morphing other parts of the face image 168 to correspond to the sound recognized in the voice recognition. As an example, the instructions may provide for morphing of face edge 170 in face image 168 to face edge 176 in image 172 (i.e., cheeks/face edge 176 are closer in than in cheeks/face edge 170, to complement the "o" sound).

Figure 7A:
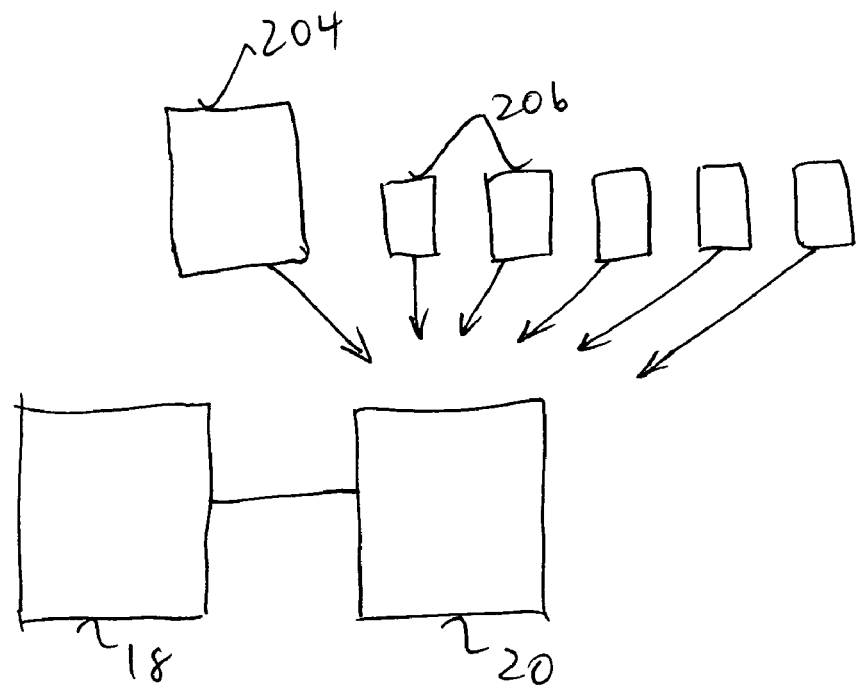
FIGS. 7a and 7b are schematic diagrams of systems according to other embodiments of the present invention.
Figure 7B:
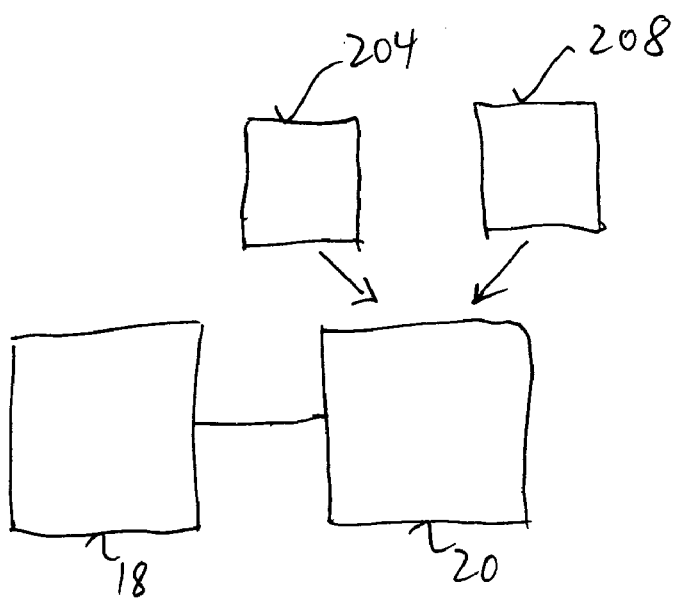

Several variations are possible in this embodiment. First, the instructions may include morphing the entire face image 168 based in whole or part (or even randomly) on the voice recognized sound. For example, the instructions may cause the CPU 18 to morph face image 172 to make the face appear that it is bobbing up and down while speaking, or shaking its head "no" when the voice recognition software recognizes the word "no," and so forth. In other words, this embodiment differs from the one previously described in that the face image 168 is morphed based wholly or in part on voice recognition, as opposed to the object position data of identifiable object points on the object (i.e., face of person 28) itself. In that sense, morphed face image 172 is largely a fictional animation, where substantially only the morphed mouth image 174 corresponds to actual movements of the mouth of the person 28. In contrast, in the previously described embodiment, the morphed high-resolution image 30 is far more real in that most or all of the movements in the virtual video showed on second monitor 22 correspond to actual movements by the person 28. A second variation is that, instead of person 28 demarcating the mouth edges 166 in face image 168, receiver 29 may perform that step. Alternatively, the step may be performed automatically by either of first and second CPU's 2, 18, such as with the use of conventional edge finding techniques. Diagrammatically, the method of this embodiment is shown in FIG. 7b, in which a high-resolution ("to-be-morphed") image 204 is sent to and stored in the second storage medium 20, and information database 208 is also stored in second storage medium 20 (either in the form of software installed in the second storage medium 20 or by receiving the information database 208 through information line 16). Also, the information database preferably includes a large number of instructions, such as at least 20, and preferably at least 40 instructions, and more preferably at least 100 instructions.

In another embodiment of the present invention, still referring to FIGS. 6a and 6b, the face image 168 (called, e.g., a base image 168) may be morphed, not by instructions in an information database, but by other images called sound face images. This embodiment is shown diagrammatically in FIG. 7a, in which the high-resolution base image 204 is sent to and stored in second storage medium 20, as well as a plurality of low-resolution sound images 206. (Of course, images 204 and 206 may have the same resolution, or images 206 may be greater in resolution.) The sound face images 206 correspond to different sound faces—i.e., faces that person 28 makes when he makes particular sounds. For example, the image corresponding to the face that person 28 makes when he makes the "t" sound may be one sound face image 206, while the image when he makes the "o" sound may be another sound face image 206. Preferably, there are a large number of sound face images 206, such as at least 20, preferably at least 40, and preferably at least 100. The morphed image 172 (which corresponds roughly to the facial expression made by person 28 when he says the "o" sound) may therefore be formed by second CPU 18 by morphing base image 168 using the sound face image 206 corresponding to the "o" sound.

It will be apparent to one of ordinary skill in the art how to morph base image 168 to form morphed "o" face image 172 using the sound face image 206 corresponding to "o."

One method is to use edge-finding and other techniques to automatically identify and locate the mouth edges 166 in image 168 and in each of the sound face images 206. Then, the resulting image position data of mouth edges of each sound face image 206 may be treated as an individual instruction corresponding to the sound corresponding that sound face image 206. So, once the sound face image 206 for the "o" sound is available, either first or second CPU's 2, 18 may identify and locate the mouth edges in the "o" sound face image 206, and then morph the mouth edges 166 of base image 168 based on the image position data in the "o" sound face image 206 to form the mouth edges 174 of morphed face image 172. Further, because each of the sound face images 206 is an actual image of the face of person 28, more than just the mouth edges 166 in face image 168 may be morphed. For example, the face edges 170, chin edge, eyebrow points, etc. may also be morphed in creating morphed image 172.

To obtain the sound face images 206, one method may be to incite the person 28 to speak a certain collection of words into the microphone 10, such as "The quick brown fox jumped over the lazy dog," which contains most consonant and vowel sounds. The CPU 2 converts this sound information into digital sound information, while simultaneously video imaging the face of the person 28 with camera(s) 12, 14 while he speaks those words. Assuming the refresh rate for the camera(s) 12, 14 is sufficiently high, each of the different sound faces created by the person's face as he makes the various sounds in the above-mentioned words will be caught by at least one image. Then, the first CPU 2, running voice recognition software contained on first storage medium 4, recognizes the person's speech and breaks it up into several component sounds, such as the "z" sound in the spoken word "lazy." The CPU 2 then determines when that sound was made, and then chooses an image taken by camera(s) 12, 14 at substantially the same time as the sound face image 206 that corresponds to that sound. The first CPU 2 does this for each of the important recognized sounds, and then creates a mapping function to map each of the recognized sounds with a corresponding sound face image 206. Then, either simultaneously with or at a different time than sending the high-resolution base face image 168, first CPU 2 sends the series of sound face images 206 (along with the mapping function) to the second CPU 18, where they are stored for retrieval in the second storage medium 20.

Then, when the person 28 speaks into microphone 10 and the digital sound information is sent to the second CPU 18 via information line 16, the second CPU 18 invokes voice recognition software from the second storage medium 20 and recognizes the component sounds in the sound information. Based on the mapping function and various sound face images 206 stored in second storage medium 20, the second CPU 18 morphs base face image 168 based on the these sound face images 206. Further, the digital voice information is changed to analog sound information by second CPU 18 and played via speakers 26. Thus (also as with the embodiment shown with respect to FIG. 7*b*), when the high-resolution base face image 204 is morphed on monitor 22 consistent with the voice information of person 28 received in digital form through information line 16, and consistent with the instructions of information database 208 (FIG. 7*b*) and/or sound face images 206 (with corresponding mapping function), what appears is a virtual video (with a chosen refresh rate of preferably greater than 5 fps) of person 28 speaking in sync with his voice sounded through speakers 26.

The above illustrations are merely examples, and the present invention is not limited by the above discussed embodiments. Of course, any of the images discussed herein could be 3D images. Also, the above embodiments were discussed with respect to person 28 as the sender of information and images, while receiver 29 receives these information and images. Of course, in a preferred embodiment, the communication is a two-way communication, in which person 28 both sends images and object position data of himself, as well as receives images and object position data from receiver 29, and vice versa.

Further, in another embodiment, object position data of the identifiable object points may be obtained in any manner known in the art, in place of or in addition to imaging the object with a camera. For example, person 28 may wear a make-up or paint on his face, or a mask or other object, that includes a plurality of small transmitters, transducers, or the like. For example, person 28 may paint his face with a paint containing randomly distributed tiny transducers that reflect electromagnetic waves, as understood by one of ordinary skill in the art. These reflected waves may be detected by a detector and used to locate each of the transducers. Then, either or both of the point differentiation and point tracking methods, as discussed herein, may be used to identify and locate these object points. Any means whatsoever for locating (i.e., ascertaining the object position data for) object points are within the scope of the present invention, including but not limited to transmitters, receivers, reflectors, transducers, emitters, etc., utilizing sound energy, electromagnetic energy, or nuclear energy. For example, the aforementioned paint may, instead, include a safe but detectable radioisotope, such as a beta emitter, and the camera(s) 12, 14 may include a directional radiation detector. Further, instead of using point differentiation to identify identifiable object points, each important feature may, instead or in addition, be identifiable with a unique color or transmitter. For a simple example, person 28 may place a small blue dot of paint at the left edge of his mouth, and a small red dot of paint at the right edge of his mouth, and so on for other important features. Instead of having to identify each identifiable object point, the first CPU 2 may immediately identify the blue point as the left mouth edge, and may proceed to ascertain object position data for this object point. As another simple example, a mask having small quantities of distinct, safe, and detectable radioisotopes at each of a plurality of important features may be worn by person 28, the camera(s) 12, 14 detecting the movement of each radiation-emitting point.

Further, the present invention is not limited to transmitting object position data for an actual object, such as person 28. In other words, "determining object position data of identifiable object points on an object" may include creating "fake" object position data of the identifiable object points, so that person 28 may send "fake" object position data. This fake object position data may correspond to a pre-taped video of person 28, or to a manipulation of an image on monitor 6 by person 28. Further, person 28 may program "code" that causes a virtual video on second monitor 22 that appears in a way determined by the program code. Further, this fake object position data may also correspond to on-the-fly instructions from person 28. For example, perhaps person 28 and receiver 29 are "chatting" using a messenger program, or even using live voice (as transmitted via information line 16). Person 28 may designate "smile" by typing "smile" or pressing a button labeled "smile" or a button with a happy face, and first CPU 2 may then create fake object position data corresponding to person 28 smiling and send this data to second CPU 18, where the virtual video on second monitor 22 appears to be person 28 smiling.

As a brief further explanation of point tracking versus point differentiation, consider three same-colored, same-shaped objects. If, while looking at these objects, a first person was to close his eyes, and a second person was to switch the places of two of the objects, the first person, after opening his eyes, would not know which object was which. On the other hand, if the first person kept his eyes open while the second person switched the objects, the first person would take note of—i.e., track—which objects had been switched, and would then be able to identify which object is which, even though they look the same. Point differentiation requires that the objects are distinguishably different, such as by having different colors, so that the first person, upon opening his eyes, would know which objects had been switched. Thus, not only does point tracking require less processing power (as discussed with respect to FIG. 5), it also allows differentiation of otherwise indistinguishable image points.

Further, according to the present invention, when one or more identifiable object points moves (e.g., with movement of the face of person 28) out of the line of sight of camera(s) 12, 14, or when the identifiable object points are not or cannot be identified as such for one reason or another (e.g., the corresponding identifiable image points don't have a sufficient contrast with surrounding pixels such as to be identified by edge-finding techniques), the sender or receiver software may be intelligent enough that the morphable image is morphed in spite of not having this additional object position data, or the software "creates" object position data based on interpolation, extrapolation, and/or the image position data of that identifiable image point in the previous frame, etc., as understood by one of ordinary skill in the art.

Figure 8A:
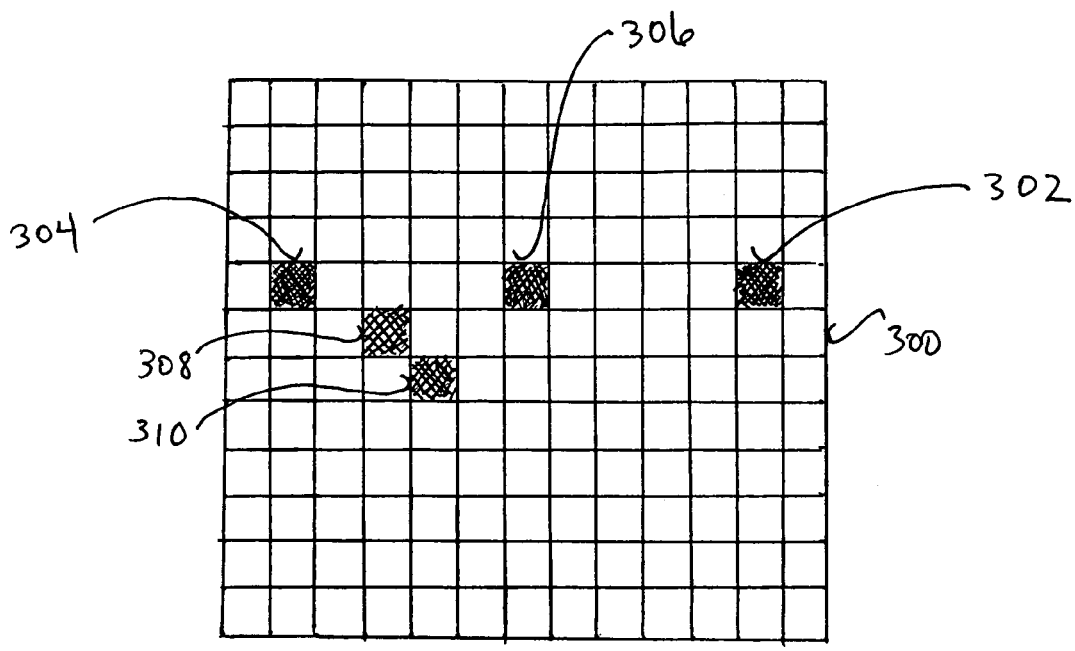
FIGS. 8a and 8b diagrammatically show a method for increasing the resolution of a low-resolution camera, according to an embodiment of the present invention.
Figure 8B:
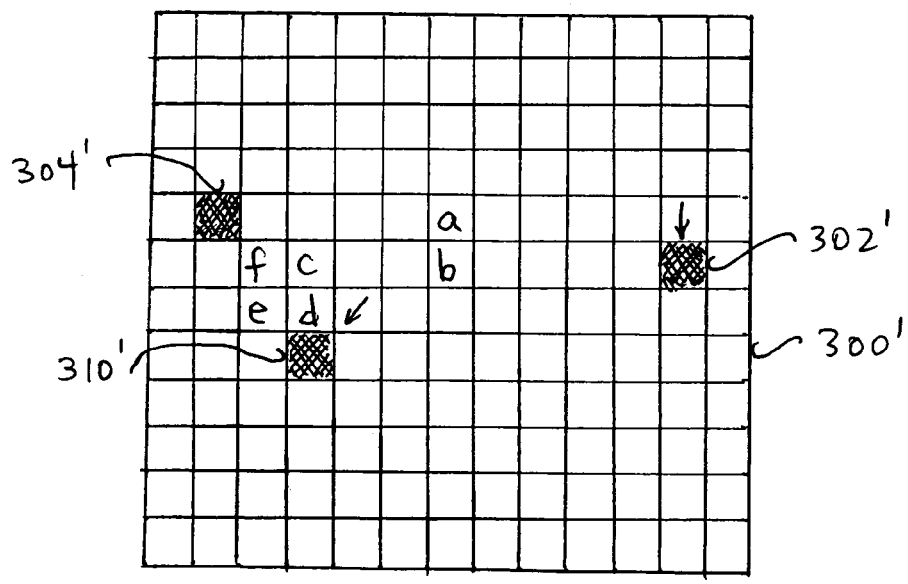

Referring briefly to FIGS. 8*a* and 8*b*, a method for increasing the resolution of an otherwise low-resolution camera will be described. For example, as discussed, high-resolution (video) camera(s) 12 and low-resolution (video) camera(s) may be combined to form medium resolution cameras for lower cost, albeit lower performance. However, a very low resolution camera, e.g., a video camera commonly known as a "web cam," may be used with the present invention, both for taking the initial high-resolution "to-be-morphed" image, as well as for later imaging the face of person 28 so as to form "low-resolution" (or possibly equal or better resolution) images for extracting image position data of identifiable image points corresponding to the object position data of the identifiable object points on the person's face. A benefit to this is that low resolution web cams are particularly inexpensive, and the present invention may have a much wider commercial appeal where the entire product— e.g., software and camera(s)—is less than $100 or $200. According to the present invention, a high-resolution image may be formed from an otherwise low-resolution camera (e.g., a camera having a photosensitive pixel array with few pixels compared to other high resolution cameras).

FIG. 8a shows a first frame 300 of an image portion having an array of pixels, showing five pixels 302, 304, 306, 308, and 310. Pixels 302, 304, and 310 correspond to identifiable image points, which could, e.g., correspond to identifiable object points such as a person's right and left eye edges, etc. FIG. 8b shows a second subsequent frame 300' of the same image portion showing three pixels 302', 304', and 310', where 302' corresponds to the same identifiable image point as 302 in FIG. 8a, except that it is a pixel lower (as shown by the downward arrow) as compared to FIG. 8a. Pixel 304' corresponds to pixel 304 in FIG. 8a, and its position has not changed from the first frame (FIG. 8a) to the second frame (FIG. 8b). Pixel 310' corresponds to pixel 310 in FIG. 8a, except that its position has changed diagonally left-downward (as shown by the arrow) as compared to FIG. 8a. Pixels "a" and "b" correspond to possible locations for pixel 306 in FIG. 8a. Pixels "c," "d," "e," and "f" correspond to possible locations of pixel 308 in FIG. 8a. In other words, (at least, and preferably only) one of pixels "a" and "b" will be identified as the corresponding identifiable image point as pixel 306, and (at least, and preferably only) one of pixels "c," "d," "e," and "f" will be identified as the corresponding identifiable image point as pixel 308.

Assuming frames 300 and 300' are spaced close enough in time (e.g., they are separated in time by ⅕ or ⅟₃₀ of a second, etc.), the physical relationship of the identifiable object points represented by identifiable image points 302, 304, 308, etc., has not changed, so that they are, for all intents and purposes, fixed with respect to each other. With this assumption, valuable information can be gleaned. For example, if, in frame 300', pixel "a" is found to correspond to pixel 306 in FIG. 8a, then it can be concluded that the identifiable image point is actually located in frame 300 somewhere in the upper half of pixel 306, and conversely the lower half if pixel "b" is found to correspond to the pixel 306. Thus, by compiling the information gleaned from frames 300 and 300', the resolution of frame 300 can at least be doubled. Further, if in frame 300', pixel "c" is found to correspond to pixel 308 in FIG. 8a, then it can be concluded that the identifiable image point is actually located in frame 300 somewhere in the upper right quarter of pixel 308, and if pixel "d" is found to correspond to pixel 308 in FIG. 8a, then it can be concluded that the identifiable image point is actually located in frame 300 somewhere in the lower right quarter of pixel 308, and so forth. Thus, by compiling the information from these two frames in this manner, the resolution of frame 300 in FIG. 8a can be quadrupled. Further, the same technique can be applied to a series of more than two frames to get better resolution, so long as the identifiable object points being imaged do not move substantially relative to each other. However, this method may require that the image be altered from one frame to the next (as in FIGS. 8a and 8b). One method of doing this will be to move and/or vibrate the low-resolution camera(s) while imaging subsequent frames, and then compiling this information as discussed.

I claim:

1. A method for creating a virtual video, comprising:
a) sending an image of an object from a sender to a receiver via an information line, said image having a plurality of identifiable image points, said plurality of identifiable image points being substantially fewer in number than a number of remaining image points of said image, said object having a plurality of identifiable object points, and said plurality of identifiable image points corresponding to said plurality of identifiable object points;
b) repeatedly imaging the object to produce a first video;
c) determining, from the first video, object position data of said plurality of identifiable object points on said object;
d) sending said object position data to said receiver via an information line;
e) morphing said image such that image position data of said identifiable image points of said image are adjusted to approximately correspond to said object position data; and
f) repeating steps c)–e) to produce a second video that substantially corresponds to the first video.

2. The method as in claim 1, wherein said morphing further comprises morphing said image such that image position data of said remaining image points are adjusted depending on said object position data.

3. The method as in claim 1, wherein said determining comprises determining three-dimensional object position data of at least one of said plurality of identifiable object points.

4. The method as in claim 1, further comprising providing at least one imaging device, wherein said determining comprises:
imaging said object with said imaging device so as to form a second image of said object, wherein said second image comprises a plurality of second identifiable image points corresponding to said plurality of identifiable object points on said object;
identifying said plurality of second identifiable image points in said second image;
determining second image position data of said plurality of second identifiable image points in said second image; and
determining said object position data of said plurality of identifiable object points on said object based at least in part on said second image position data.

5. The method as in claim 1, further comprising providing at least one imaging device,
wherein said determining comprises for a first frame:
imaging said object so as to form a second image of said object, wherein said second image comprises a plurality of second identifiable image points corresponding to said plurality of identifiable object points on said object;
identifying said plurality of second identifiable image points in said second image;
determining second image position data of said plurality of second identifiable image points in said second image; and
determining said object position data of said plurality of identifiable object points on said object based at least in part on said second image position data,
and wherein said determining comprises for a subsequent second frame:
imaging said object so as to form a third image of said object, wherein said third image comprises a plurality of third identifiable image points corresponding to said plurality of identifiable object points on said object;
identifying said plurality of third identifiable image points in said third image by point tracking, whereby a third identifiable image point is identified by: selecting a group of points within a predetermined proximity to a corresponding second identifiable image point in said second image of said first frame; and identifying said third identifiable image point within said group based at least in part on a best fit analysis;

determining third image position data of said plurality of third identifiable image points in said third image; and determining said object position data of said plurality of identifiable object points on said object based at least in part on said third image position data.

6. The method as in claim 5, wherein said predetermined proximity is chosen based at least in part on an expected motion speed of said object and a refresh time between said first and second frames.

7. The method as in claim 1, wherein performance of steps c) through e) is repeated at a rate of at least 5 times per second.

8. The method as in claim 1, further comprising providing a laser system comprising a laser and a laser light detector, wherein said determining comprises determining said object position data of said plurality of identifiable object points on said object based at least in part on information received from said laser system.

9. A computer readable medium containing machine-executable code and configured to cause a machine to perform the method as in claim 1.

10. The method as claimed in claim 1, wherein the sender and receiver are located in different cities.

* * * * *